(12) United States Patent
Sickler

(10) Patent No.: US 12,321,077 B2
(45) Date of Patent: Jun. 3, 2025

(54) FREE-SPACE BEAM STEERING SYSTEMS, DEVICES, AND METHODS

(71) Applicant: Torchlight Solutions, LLC, Arlington, MA (US)

(72) Inventor: Jason W. Sickler, Arlington, MA (US)

(73) Assignee: Torchlight Solutions, LLC, Arlington, MA (US)

( * ) Notice: Subject to any disclaimer, the term of this patent is extended or adjusted under 35 U.S.C. 154(b) by 0 days.

(21) Appl. No.: 18/115,741

(22) Filed: Feb. 28, 2023

(65) Prior Publication Data

US 2023/0280633 A1 Sep. 7, 2023

Related U.S. Application Data

(63) Continuation of application No. 17/674,826, filed on Feb. 17, 2022, now abandoned, which is a continuation of application No. 17/009,774, filed on Sep. 1, 2020.

(60) Provisional application No. 62/869,559, filed on Jul. 1, 2019.

(51) Int. Cl.
   *G02F 1/295* (2006.01)
   *G01S 7/481* (2006.01)

(52) U.S. Cl.
   CPC ............ *G02F 1/295* (2013.01); *G02F 1/2955* (2013.01); *G01S 7/4817* (2013.01); *G02F 2203/24* (2013.01)

(58) Field of Classification Search
   CPC ............ G02F 1/29; G02F 1/2955; G02F 1/31
   See application file for complete search history.

(56) References Cited

U.S. PATENT DOCUMENTS

| | | | | |
|---|---|---|---|---|
| 6,128,421 A | * | 10/2000 | Roberts | G02F 1/2955 385/147 |
| 2012/0013962 A1 | * | 1/2012 | Subbaraman | G02B 6/1225 359/15 |

* cited by examiner

*Primary Examiner* — Michael Stahl
(74) *Attorney, Agent, or Firm* — Thorpe North & Western, LLP; David W. Osborne

(57) ABSTRACT

Devices and systems having a vertical waveguide array are provided having a plurality of vertical waveguides disposed on a support substrate in an array, where each vertical waveguide further includes a reflective layer positioned to reflect impinging light toward the support substrate, a core region extending from the reflective layer to the support substrate, the core region further comprising, a first contact region and a second contact region electrically isolated from one another disposed between the reflective layer and the support substrate, and a low refractive index material disposed between the first contact region and the second contact region. The first contact region and the second contact region are operable to create a voltage drop across the low refractive index material and the low refractive index material has a lower refractive index compared to the refractive indexes of the first contact region and the second contact region. Additionally, a confinement structure surrounds the periphery of each waveguide, where the confinement structure has a lower refractive index compared to the refractive indexes of the first contact region and the second contact region.

16 Claims, 11 Drawing Sheets

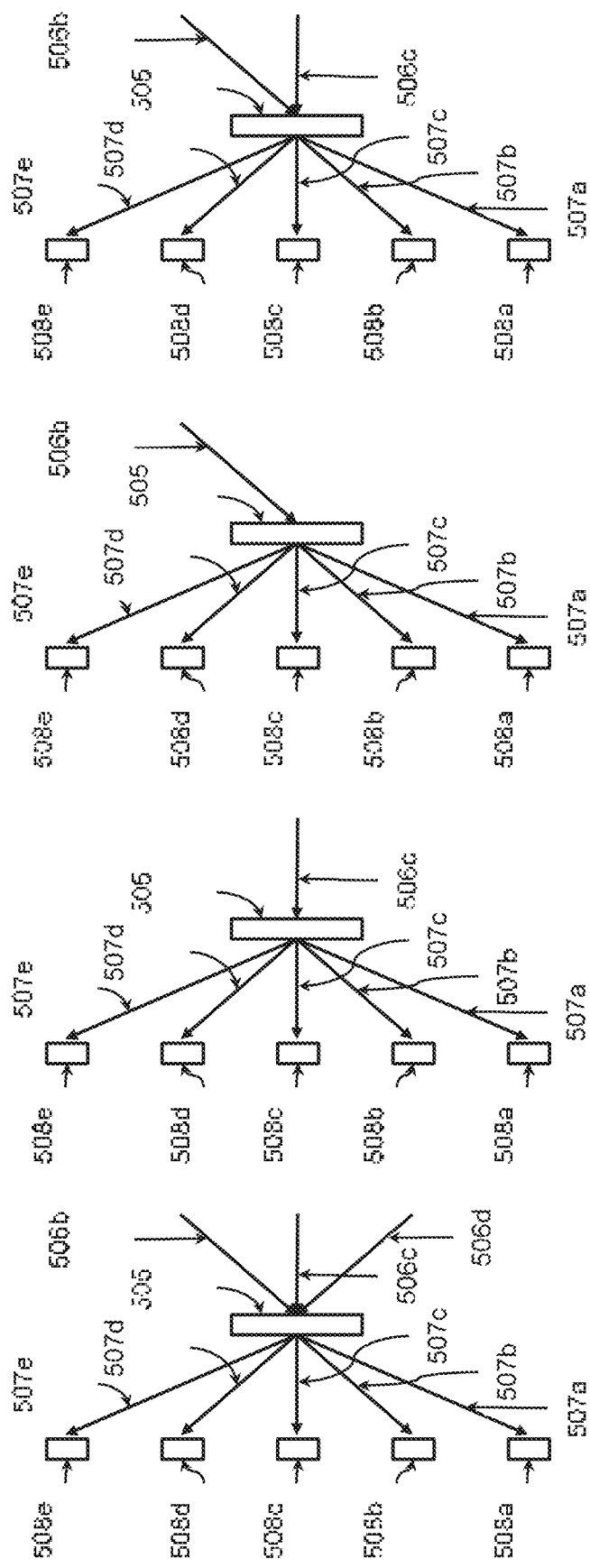

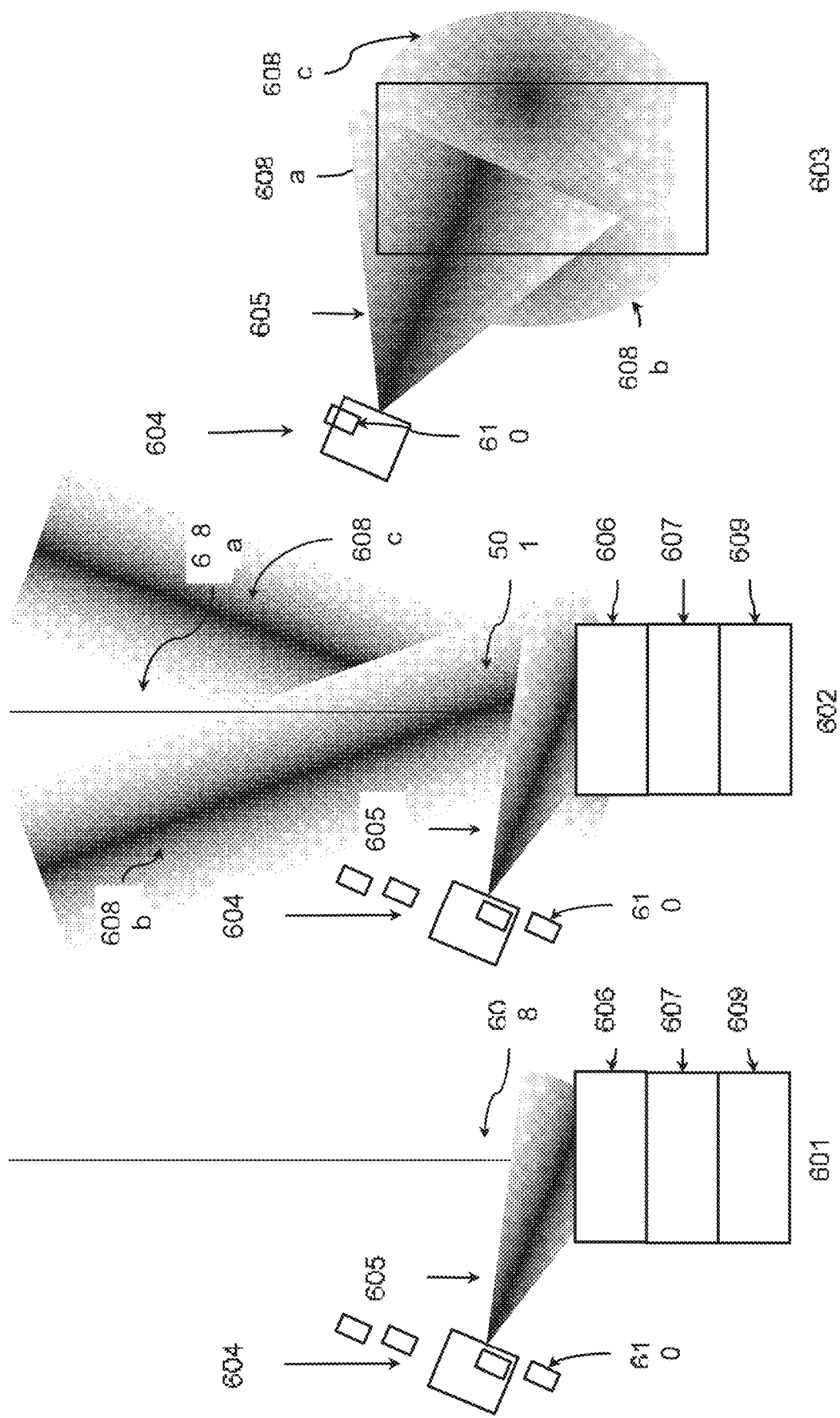

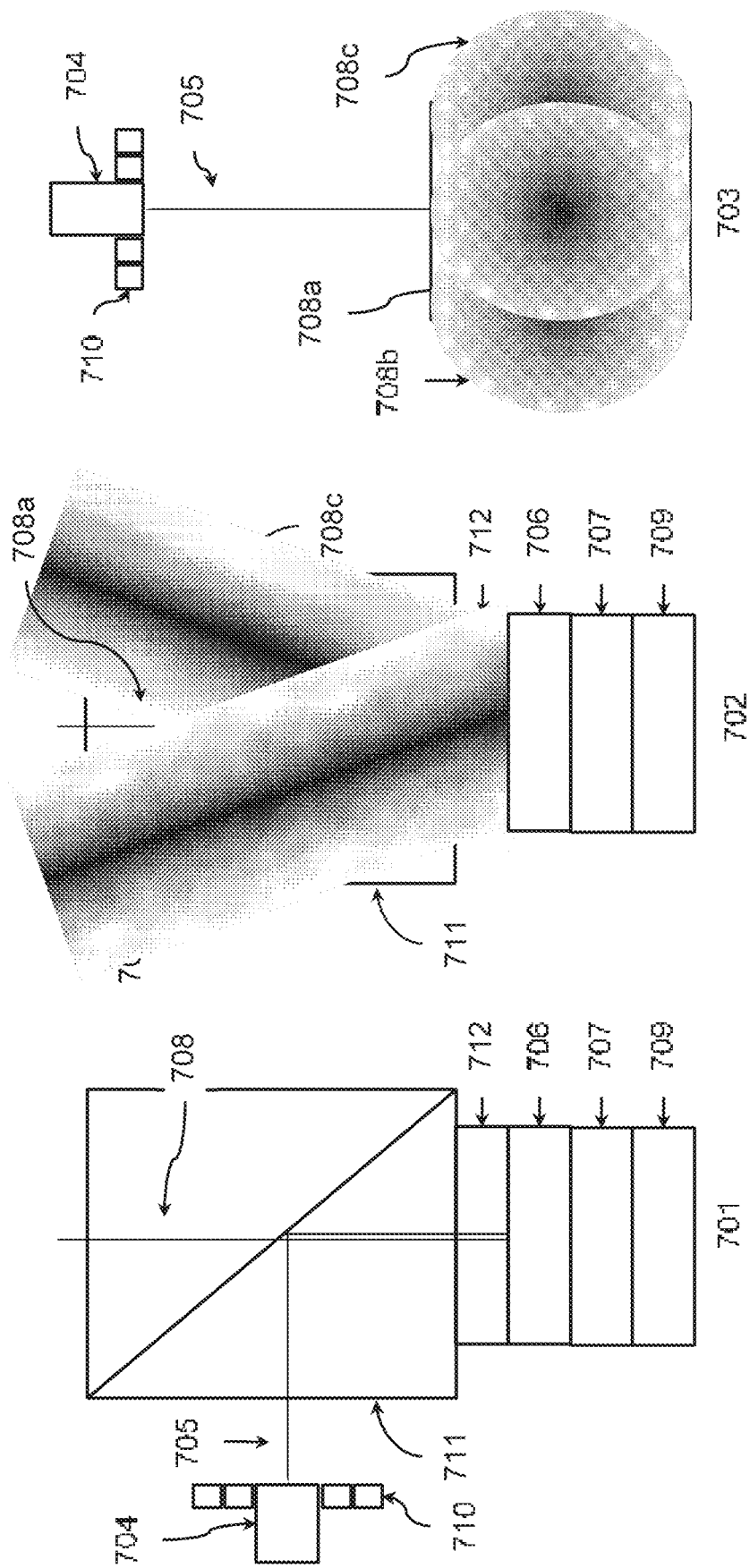

| FIG. 9A | FIG. 9B | FIG. 9C |
|---|---|---|
| Control Chip (809) | Control Chip (809) | Control Chip (809) |
| Control Region (808) | High Reflecting Region (803) | High Reflecting Region (803) |
| High Reflecting Region (803) | Control Region (808) | Control Region (808) |
| Modulation Region (802) | Modulation Region (802) | Modulation Region (802) |
| Partially Reflecting Region (803) | Partially Reflecting Region (803) | Control Region (808) |
| Control Region (808) | Control Region (808) | Partially Reflecting Region (803) |
| Diffractive Optic Region | Diffractive Optic Region | Diffractive Optic Region |

FREE-SPACE BEAM STEERING SYSTEMS, DEVICES, AND METHODS

CROSS-REFERENCE TO RELATED APPLICATIONS

This application is a continuation of U.S. patent application Ser. No. 17/674,826, filed on Feb. 17, 2022, which is a continuation of U.S. patent application Ser. No. 17/009,774, filed on Sep. 1, 2020, which claims the benefit of U.S. Provisional Patent Application No. 62/869,559, filed on Jul. 1, 2019, each of which is incorporated herein by reference in its entirety.

BACKGROUND

Electromagnetic radiation often is in the form of beams. To make use of such beams, they often must be directed, or steered, to where it is needed for an application. For example, this might be done for cutting and drilling, for exposing a target and measuring one or more of its properties, for free-space communications, or for Light Detection And Ranging (LIDAR). In some examples, such LIDAR systems can be used to measure the environment and provide information to other systems. In other examples, this information can be displayed for current use, and/or stored for later use.

BRIEF DESCRIPTION OF THE DRAWINGS

FIG. 5A illustrates an example of a beam steering system in accordance with an example embodiment;

FIG. 5B illustrates an example of a beam steering system in accordance with an example embodiment;

FIG. 5C illustrates an example of a beam steering system in accordance with an example embodiment;

FIG. 5D illustrates an example of a beam steering system in accordance with an example embodiment;

FIG. 6A illustrates an example of a beam steering system in accordance with an example embodiment;

FIG. 6B illustrates an example of a beam steering system in accordance with an example embodiment;

FIG. 6C illustrates an example of a beam steering system in accordance with an example embodiment;

FIG. 7A illustrates an example of a beam steering system in accordance with an example embodiment;

FIG. 7B illustrates an example of a beam steering system in accordance with an example embodiment;

FIG. 7C illustrates an example of a beam steering system in accordance with an example embodiment;

FIG. 9A illustrates an example of a beam steering device in accordance with an example embodiment;

FIG. 9B illustrates an example of a beam steering device in accordance with an example embodiment;

FIG. 9C illustrates an example of a beam steering device in accordance with an example embodiment;

DESCRIPTION OF EMBODIMENTS

Figure 1:
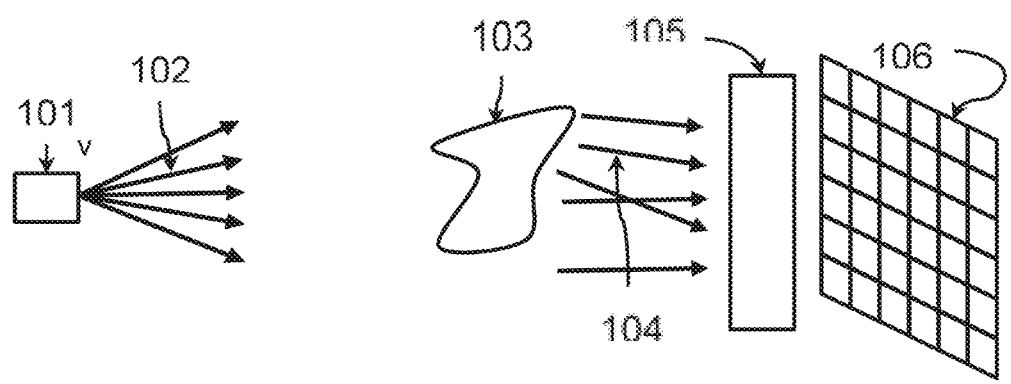
FIG. 1 illustrates a flash LIDAR device in accordance with an example embodiment.

Although the following detailed description contains many specifics for the purpose of illustration, a person of ordinary skill in the art will appreciate that many variations and alterations to the following details can be made and are considered included herein. Accordingly, the following embodiments are set forth without any loss of generality to, and without imposing limitations upon, any claims set forth. It is also to be understood that the terminology used herein is for describing particular embodiments only and is not intended to be limiting. Unless defined otherwise, all technical and scientific terms used herein have the same meaning as commonly understood by one of ordinary skill in the art to which this disclosure belongs. Also, the same reference numerals in appearing in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to provide a thorough understanding of various embodiments. One skilled in the relevant art will recognize, however, that such detailed embodiments do not limit the overall concepts articulated herein, but are merely representative thereof. One skilled in the relevant art will also recognize that the technology can be practiced without one or more of the specific details, or with other methods, components, layouts, etc. In other instances, well-known structures, materials, or operations may not be shown or described in detail to avoid obscuring aspects of the disclosure.

In this application, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open-ended term in this written description, like "comprising" or "including," it is understood that direct support should be afforded also to "consisting essentially of" language as well as "consisting of" language as if stated explicitly and vice versa.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a given term, metric, value, range endpoint, or the like. The degree of flexibility for a particular variable can be readily determined by one skilled in the art. However, unless otherwise expressed, the term "about" generally provides flexibility of less than 1%, and in some cases less than 0.01%. It is to be understood that, even when the term "about" is used in the present specification in connection with a specific numerical value, support for the exact numerical value recited apart from the "about" terminology is also provided.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of phrases including "an example" or "an embodiment" in various places throughout this specification are not necessarily all referring to the same example or embodiment.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

As used herein, comparative terms such as "increased," "decreased," "better," "worse," "higher," "lower," "enhanced," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a data region that has an "increased" risk of corruption can refer to a region of a memory device which is more likely to have write errors to it than other regions in the same memory device. A number of factors can cause such increased risk, including location, fabrication process, number of program pulses applied to the region, etc.

An initial overview of embodiments is provided below, and specific embodiments are then described in further detail. This initial summary is intended to aid readers in understanding the disclosure more quickly, and is not intended to identify key or essential technological features, nor is it intended to limit the scope of the claimed subject matter.

LIDAR can be used for measuring and/or imaging scenes in three dimensions (3-D). The typical data set a LIDAR system can produce is called a point cloud and can include distance/range values as a function of position within the LIDAR device field of view (FOV). Each determination of the distance value may correspond to the measurement of the time-of-flight (TOF), that is, the time it takes for one or more photons to travel from a source, to the scene, and then reflect back to a sensor.

As with typical two-dimensional (2-D) intensity imagers, conventional LIDAR systems can sample the lateral space. One class of systems that can do this is the so-called flash LIDAR, shown in FIG. 1, which is most analogous to the typical photographic camera operation. Here a scene 103 can be uniformly illuminated with a source 101 (in some examples, a single source), and an array of detectors 106 can measure photon TOF for photons 104 that reflect back to it, thereby acquiring range information and the data sufficient to form a 3-D point cloud image. This process may be repeated multiple times and combined to produce a final single image in order to improve performance and SNR. This process can have advantages, including but not limited to the potential for single-shot imaging, and a simple, single, unstructured illumination source. It also can have drawbacks, including the need for expensive detector arrays, higher illumination power requirements, and a limited ability to leverage techniques such as compressed sensing.

Figure 2:
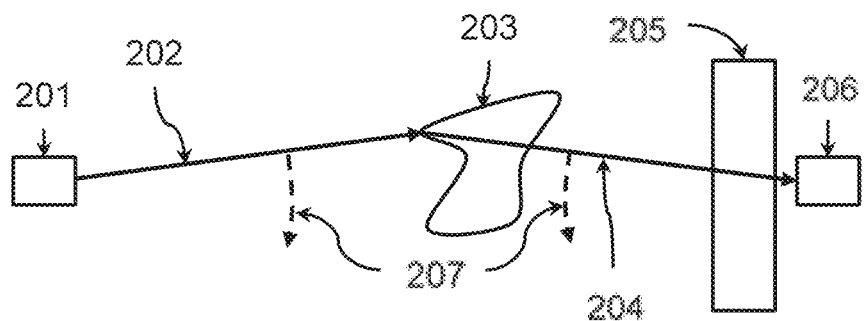
FIG. 2 illustrates a technique for sampling a scene laterally using a scanning LIDAR in accordance with an example embodiment.

A scene can also be sampled laterally using a scanning LIDAR, shown in FIG. 2. Instead of illuminating the entire scene 203, one or more illumination sources 201 can be directed as beams to a small region of the scene, and then scanned as indicated by arrows 207 over time through the lateral dimensions to cover the entire scene 203. As this happens, one or more detectors 206 can measure the photons' TOF. This data can be collected as the scene is scanned, at the end of which an image can be generated. This can have advantages that the illumination source can be simple and unstructured, and it may not require expensive sensor arrays.

One straightforward approach to beam steering for scanning LIDAR is to use reflective galvanometers, spinning polygons/prisms, or other types of actuated sub-systems. Other approaches to scanning include the use of spatial light modulators (SLMs), which are generally composed of an array of modulating elements, herein referred to as pixels. Such SLMs can include digital micromirror devices (DMDs), liquid crystal on silicon (LCoS), and others. Yet another approach is photonic integrated circuit (PIC)-based optical phased arrays (OPAs). The latter class of systems has no moving parts and is often made in silicon and/or uses electromagnetic radiation with wavelengths around 1550 nm.

The present disclosure provides systems, devices, and methods for practical, efficient beam steering that incorporate SLMs and that have significant advantages over previously mentioned methods. Such advantages can include having no moving parts, system improvements in performance through previously unavailable tradeoffs, system cost reductions, faster scanning times, smaller size, lighter weight, lower power (SWaP), and the like.

The presently disclosed systems, devices, and methods can be used with a variety of light sources. Non-limiting examples can include semiconductor lasers, solid-state lasers, fiber lasers, dye lasers, integrated photonics lasers, light-emitting diodes, thermal sources, or others, including combinations thereof. Non-limiting examples of light source operation mode can include pulsed, continuous wave, frequency-modulated, or others, including combinations thereof. Non-limiting examples of pulsed operation can include gain-switching, Q-switching, mode-locking, external-cavity modulation. In one example, the light source can incorporate stabilization in order to narrow a laser linewidth, prevent mode-hopping, increase the coherence length, improve the transverse beam quality, or others, including combinations thereof. Non-limiting examples of stabilization can include optical filtering, temperature stability, optical feedback, or others, including combinations thereof.

Solid-state SLMs (SS-SLMs), which can be used in reflection or transmission, can generally be made using materials such as silicon (Si), silicon dioxide ($SiO_2$), silicon nitride ($Si_3N_4$), silicon oxynitride ($SiO_xN_y$), silicon-germanium (SiGe), germanium (Ge), gallium arsenide (GaAs), aluminum arsenide (AlAs), aluminum gallium arsenide ($AlxGa_yAs$), indium gallium arsenide ($In_xGa_yAs$), indium phosphide (InP), aluminum gallium indium nitride (AlGaInN), aluminum gallium indium phosphide (AlGaInP), gallium nitride (GaN), mercury cadmium telluride (HgCdTe), other III-V materials or the like, including combinations thereof.

A number of modulation techniques can be used to create a modulating region in SS-SLM pixels. In one example, quantum confining structures are used. In such structures, the quantum-confined Stark effect (QCSE) can be used to modulate the amplitude and phase response. This effect emerges when carriers (e.g., electrons, holes, excitons) are confined in the modulating region such that quantum effects are significant and change the band structure as a function of applied voltage, thereby changing the absorption and phase response of the modulating region. The modulating regions can contain one or more quantum confining structures, which may include one or more quantum wells, quantum wires, quantum dots, or combinations thereof, and can be arranged with uniform or non-uniform spacing and can be periodically or aperiodically placed. The quantum structures can be positioned such that at least two structures are in electronic communication (i.e. coupled), and/or such that at least one structure is not in electronic communication with other structures. For example, quantum structures in electronic communication can enable control of the overlap of electron and/or hole wavefunctions, thereby allowing better control of the modulation effects and which may include larger magnitude modulation effects. In another example, the modulating region can contain one or more superlattice structures. As an example, such structures can be created by varying doping type, doping concentration, material type, or combinations thereof. The absorption and phase spectra can be modulated, for example, through the Wannier-Stark effect by applying a voltage. As well, modulation can be accomplished in semiconductors by applying an electric field across the device, changing the carrier density through carrier injection, depletion and/or excitation (e.g. optically, electrically), inducing thermo-optic effects applied to the modulating region, or combinations thereof. Two or more modulation techniques can also be used simultaneously. Non-limiting examples can include a combination of carrier depletion and QCSE, or a combination of thermo-optic and superlattice biasing.

The actuation of SLM modulation can be done with a voltage, a current, or by exposure to electromagnetic radiation such as light. When modulating using voltage, the voltage magnitude can have a lower limit of a voltage capable of generating a detectable modulation in a signal, and otherwise can, in some examples, be less than or equal to 1.8 V, less than or equal to 3.3 V, less than or equal to 5 V, less than or equal to 10 V, less than or equal to 20 V, or less than or equal to 100 V. When modulating using a current, the current magnitude can have a lower limit of a current capable of generating a detectable modulation in a signal, and otherwise be less than or equal to 1 mA, less than or equal to 10 mA, less than or equal to 100 mA, less than or equal to 1 A, or less than or equal to 5 A or more.

In some cases, the single-pass amplitude and phase response of the SLM pixels can be small compared to what an application requires. In that case, resonance effects can be used to achieve a stronger effect. This can be accomplished by placing the modulating region in a resonator, which can be a symmetric Fabry-Perot resonator, an asymmetric Fabry-Perot resonator, a Gire-Tournois resonator, or any other suitable resonant structure capable of accepting a modulating region.

Reflecting regions, which can be partially reflecting with reflectivities less than or equal to 95%, or fully reflecting with reflectivities greater than 95%, can be positioned to reflect light and are referred to herein as a resonator structure. A reflecting region can include a variety of materials and material combinations. For example, a reflecting region can include, without limitation, metals, transparent conducting films (TCFs), conductive polymers, interference stacks, and the like, including combinations thereof.

Non-limiting examples of metal reflecting region materials can include aluminum, copper, gold, silver, and the like, including metal alloys and combinations thereof. Non-limiting examples of TCFs can include transparent conductive oxides (TCOs) such as metal oxides doped with indium (e.g. indium tin oxide), fluorine, aluminum, and the like, including dopant combinations thereof. Non-limiting examples of metal oxides can include oxides of tin, cadmium, zinc, or combinations thereof. Non-limiting examples of conductive polymers can include polyacetylene, polyaniline, polypyrrole, polythiophene derivatives, or combinations thereof. The reflecting regions can also include interference stacks, which can be composed of layers that are about a quarter-wave in thickness in some examples, or about a half-wave or on the order of about a wavelength in other examples, and can be made of silicon (Si), silicon dioxide ($SiO_2$), silicon nitride ($Si_3N_4$), silicon oxynitride ($SiO_xN_y$), silicon-germanium (SiGe), germanium (Ge), gallium arsenide (GaAs), aluminum arsenide (AlAs), aluminum gallium arsenide ($Al_xGa_yAs$), indium gallium arsenide ($In_xGa_yAs$), indium phosphide (InP), aluminum gallium indium nitride (AlGaInN), aluminum gallium indium phosphide (AlGaInP), gallium nitride (GaN), mercury cadmium telluride (HgCdTe), other III-V materials or the like, or combinations thereof.

To adjust the achievable range of beam angles emerging from an SLM, for example an SS-SLM, in one example structures can be placed on the exiting face of the device. Such structures could include scatterers, grating structures, other diffractive optic structures, or microlens arrays. In the last case, the microlens array can have a pitch that is substantially equal to an integer multiple of the SLM pixel pitch, including a pitch that is equal to the SLM pixel pitch. The microlens array can be bonded to or fabricated on the SLM, and can have numerical apertures as large as 0.87, as large at 0.72, as large as 0.66, or as large as 0.29.

Achieving large angular scanning range and high angular resolution allows for larger, higher resolution imaging. The latter is enabled by keeping the beam divergence angle smaller than the angular resolution. A metric for these performance parameters can be the ratio of the SLM pixel-containing region area to individual SLM pixel area. In some examples, this ratio can be greater than 25,000,000, greater than 10,000,000, greater than 4,000,000, or greater than 2,000,000. In some examples, the angular scanning ranges can be greater than about −4° to about +4° with beam widths at 200 m away of less than about 15 mm or less than about 11 mm. In other examples, the angular scanning range can be about −12° to about +12° with beam widths at 200 m away of less than about 15 mm or less than about 11 mm.

In another example, to apply voltages to actuate modulation, contacts can be used. A contact can be one continuous plane substantially covering the SLM pixel-containing region of the device or may be patterned. One contact can be patterned such that the optical fill factor is greater than 50%, greater than 70%, or greater than 90%. As part of the patterning, one or more etch processes can be used. A contact can be placed between the modulating region and the substrate, or between the modulating region and the device outer surface.

A contact can incorporate, without limitation, metals, doped semiconductors, transparent conducting films (TCFs), conductive polymers, and the like, including combinations thereof. Non-limiting examples of metal contact region materials can include aluminum, copper, gold, silver, and others, including metal alloys and combinations thereof. Non-limiting examples of semiconductors can include n-doped semiconductors, and/or p-doped semiconductors, where said semiconductors can include silicon (Si), silicon dioxide ($SiO_2$), silicon nitride ($Si_3N_4$), silicon oxynitride ($SiO_xN_y$), silicon-germanium (SiGe), germanium (Ge), gallium arsenide (GaAs), aluminum arsenide (AlAs), aluminum gallium arsenide ($Al_xGa_yAs$), indium gallium arsenide ($In_xGa_yAs$), indium phosphide (InP), aluminum gallium indium nitride (AlGaInN), aluminum gallium indium phosphide (AlGaInP), gallium nitride (GaN), mercury cadmium telluride (HgCdTe), other III-V materials or the like, or combinations thereof. Non-limiting examples of TCFs can include transparent conductive oxides (TCOs) such as metal oxides doped with indium (e.g. indium tin oxide), fluorine, aluminum, and the like, including dopant combinations thereof. Non-limiting examples of metal oxides can include oxides of tin, cadmium, zinc, or combinations thereof. Non-limiting examples of conductive polymers can include polyacetylene, polyaniline, polypyrrole, polythiophene derivatives, or combinations thereof.

SS-SLMs can switch their modulation values faster than other types of SLMs. For example, the single-pixel switching speed of an SS-SLM can be shorter than 100 ns, shorter than 500 ns, shorter than 1 µs, shorter than 10 µs, or shorter than 100 µs. As well, the switching speed of the entire SS-SLM array can be faster than 10 kHz, 50 kHz, 100 kHz, 500 kHz, or even faster than 1 MHz.

The performance of a SLM can be improved by combining it with one or more refractive and/or diffractive optical elements (DOEs). DOEs can be binary using two or more discrete levels, provide a piecewise-continuously varying surface, be holographic, replicated, ruled, or other. One or more of the DOEs may also be directly fabricated on the SLM device. For example, this can be accomplished on an SS-SLM through masking and etching the surface. Such elements can be used to shape the beam prior to steering it with the SLM, and can, for example, reduce the average SLM power requirements and/or simplify the SLM control signals. In one example, one or more lenses are placed before the SLM to reduce the average voltages imposed on and power consumed by the SLM.

As well, refractive optics or DOEs can be used to increase functionality. In one example, the optical elements lead to the generation of two or more simultaneous beams. This can be advantageous when, for example, scanning coverage over an angular FOV is required. For example, with two beams, the angular range needed to scan across the FOV can be reduced by about a factor of two. For another example, with three beams, it can be reduced by about a factor of three. In this way, the coverage of the FOV, the angular tuning range requirements, and the power per beam can be traded off to improve system performance for given application. For example, in a LIDAR application, a laser source can produce sufficient optical power such that 2-10 beams can be supported with sufficient signal-to-noise ratio (SNR) for the application. In some configurations, multiple or even all beams can be emitted along a common plane. In other configurations, one or more groups of two or more beams can be emitted along one or more common planes.

Figure 3A:
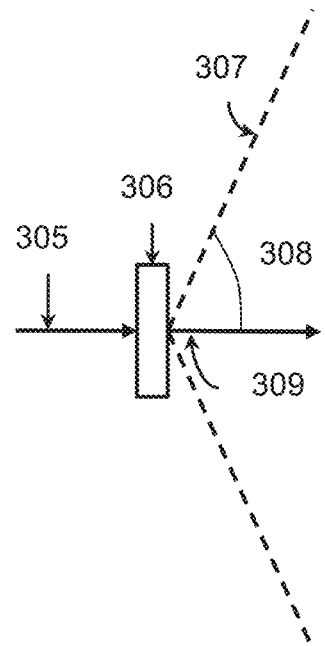
FIG. 3A illustrates an example of a beam steering system in accordance with an example embodiment.
Figure 3B:
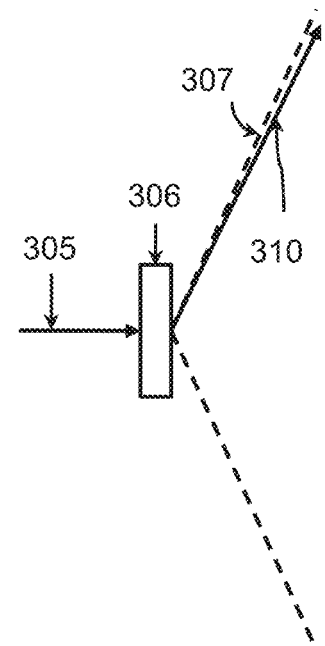
FIG. 3B illustrates an example of a beam steering system in accordance with an example embodiment.
Figure 4A:
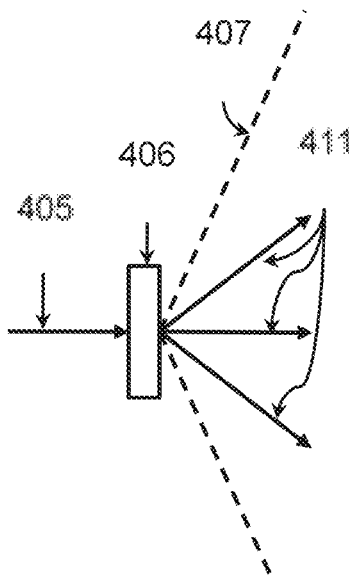
FIG. 4A illustrates an example of a beam steering system in accordance with an example embodiment.
Figure 4B:
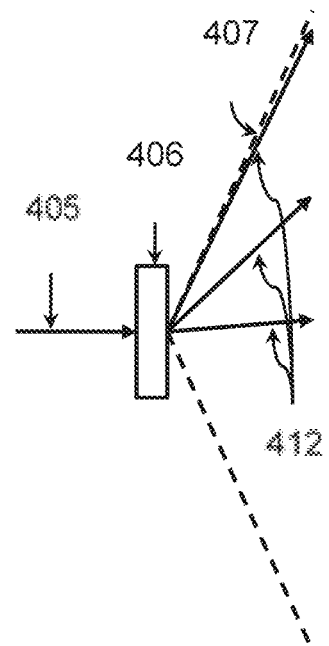
FIG. 4B illustrates an example of a beam steering system in accordance with an example embodiment.

Examples are shown in FIGS. 3A and 3B and in FIGS. 4A and 4B. Shown are configurations with one output beam 309 steered to zero deflection angle in FIG. 3A, one output beam 310 steered to full deflection in FIG. 3B, multiple output beams 411 steered to zero deflection angle in FIG. 4A, and multiple output beams 412 steered to full deflection angle in FIG. 4B. In all configurations of FIGS. 3A, 3B and FIGS. 4A, 4B, an input beam 305, 405 is incident on the beam steering device 306, 406, and the maximum beam angle 308, 408 and associated beam path 307, 407 at the edge of the field of view is shown, and is the same in all configurations of FIGS. 3A, 3B and FIGS. 4A, 4B. FIG. 3A shows a single beam with no deflection. To cover the FOV, that single beam can be deflected by an amount approaching the maximum beam angle required by the FOV 308, resulting in a single, fully deflected beam 310 shown in FIG. 3B. Alternatively, FIG. 4A shows a device 406 configured to output multiple beams, where configuration 403 shows multiple beams 411 with zero deflection angle. To cover the entire FOV, the fully deflected multiple beams 412 can be deflected by a substantially smaller angle than the maximum beam angle 408 required by the application's FOV. In this way, the beam steering angular range can be reduced while still satisfying the FOV requirement.

In cases where the optical response to the steered beam light is also received and detected as with a LIDAR application, for example, and there are multiple beams being simultaneously emitted, a system can be configured to determine from which beam the reflected light originated. Such a system can incorporate a number of detectors equal to between one and the number of beams emitted, although more detectors can be used to improve performance. The ability to function with different numbers of detectors allows different device configurations to be utilized in different applications due to the tradeoff between the number of detectors and the device performance.

As shown in FIGS. 5A-5D, for example, a device shows a situation where beams 506b-506d can be received in any combination and transmitted back through the beam steering device 505, which then directs the received energy into multiple beams 507a-507e, each beam of which is detected by detectors 508a-508e, respectively.

As a general example, consider a beam steering system, which can be incorporated into a LIDAR system, having a SLM designed to emit three beams simultaneously. Reflections of any two such beams will, in general, not likely arrive at the device simultaneously. In the instance that it does, the light will interfere and can primarily reflect back to the laser source. More commonly, however, light will arrive from only one beam at a given time. In such cases, the light will reflect back through the SLM and DOE and be split again into multiple beams. By placing detectors properly, these multiple beams can be detected at various detectors to extrapolate their origins according to their relative detected signals. As well, each detector can individually measure the arrival time of a given beam, and such multiple measurements can be used to improve the arrival time measurement accuracy and/or precision of each reflected beam, for example, by averaging multiple measurements. Furthermore, in some cases, the arrivals times of each reflected beam can be determined by looking at the relative detector signal powers, thereby removing the need to know the absolute power in the beams initially.

FIGS. 5A-5D provides additional example configurations that show a beam steering device 505. The configuration shown in FIG. 5A shows all possible beam paths, including a first through third received beam 506a-c, a first through fifth beam 507a-507e, and a first through fifth detector 508a-508e. The configuration in FIG. 5B shows the center beam path received, and the power is only being received in the form of the second received beam 506c. As shown, the beam steering device distributes beam 506c's power into first through fifth beams 507a-507e, which are then detected by first through fifth detectors 508a-508e, respectively. This provides a) between one and five signals of relative magnitudes, and b) between one and five timing measurements. In this way, uncorrelated noise (e.g. noise from the measurement system) can be averaged, and the fact that the power came from beam 506c can be determined.

In the configuration shown in FIG. 5C, a non-center beam path is received, and power is only being received in the form of the first received beam 506b. As shown, the beam steering device distributes beam 506b's power into beams 507a-507e, which are then detected by detectors 508a-508e, respectively. This provides a) between one and five signals of relative magnitudes, and b) between one and five timing measurements. Similar to configuration 502, uncorrelated noise (e.g. from the measurement system) can be averaged, and the fact that the power came from beam 506b can be determined.

The configuration of FIG. 5D shows a center and non-center beam path received simultaneously, power is received simultaneously from first beam 506b and second beam 506c. Here, simultaneously means that the difference in the time of flight of beams 506b and 506c is less than the beam pulse duration. As shown, the beam steering device distributes beam 506b's and beam 506c's power into beams 507a-507e, which are then detected by detectors 508a-508e, respectively. This provides a) between one and five signals of relative magnitudes, and b) between one and five timing measurements. Similar to the configuration shown in FIG. 5B, uncorrelated noise (e.g. from the measurement system) can be averaged, and the fact that the power came from both beam 506b and 506c can be determined. If the difference in time of flight between beams 506b and 506c exceeds the coherence time, then the signals will add in power. As well, if the difference in the time of flight between beams 506b and 506c is shorter than the coherent time, then the signals will interfere, and the signals detected by detectors 508a-508e will show this in the form of, for example, an interference pattern. In some cases, if the coherence time is shorter than the pulse durations, the presence of interference in the signal could be used to more accurately deduce various parameters of interest, for example, the arrival times and/or the relative velocity of the two targets associated with the returned beams.

The sensors used to detect return signals can incorporate electronic amplification or gain. In some examples, the amplification or gain can be achieved through an avalanche process, for example by using an avalanche photodiode, or a photomultiplication process using, for example, a photomultiplier tube. In other examples, the amplification or gain can be achieved through a photoconductive process. In yet other examples, the amplification or gain can be achieved through the supporting detection circuit and can involve one or more transistors. In some examples, the sensor elements that have amplification or gain can be operated in Geiger mode. In other examples, the sensor elements that have amplification or gain can be operated in a substantially linear mode.

The sensors can be made using a variety of materials. Non-limiting examples can include silicon (Si), silicon dioxide ($SiO_2$), silicon nitride ($Si_3N_4$), silicon oxynitride ($SiO_xN_y$), silicon-germanium (SiGe), germanium (Ge), gallium arsenide (GaAs), aluminum arsenide (AlAs), aluminum gallium arsenide ($AlxGa_yAs$), indium gallium arsenide ($In_xGa_yAs$), indium phosphide (InP), aluminum gallium indium nitride (AlGaInN), aluminum gallium indium phosphide (AlGaInP), gallium nitride (GaN), mercury cadmium telluride (HgCdTe), other III-V materials or the like, including combinations thereof. In still other additional non-limiting examples, the sensor may contain at least one of Al, As, Ga, Ge, In, N, O, P, or Si. The material can be at least partially textured. The texturing can be done with a chemical, mechanical, or laser process, for example using a black silicon process, where the textured region is at least partially within the photocarrier generation region and where the textured region leads to enhanced photoresponse.

In some examples, the sensor can be fabricated with a CMOS process. In other examples, the sensor can be a charge-coupled device (CCD).

The sensor can be operated in an incoherent detection mode. It can also operate in a coherent detection mode, for example by interfering a portion of the source electromagnetic radiation with returned electromagnetic radiation. In the latter case, the sensor can be used to detect velocity, for example, with a single measurement. Velocity can also be determined by making multiple measurements over time and calculating velocities from that. Velocity can also be determined from Doppler shifts when operating in a coherent detection regime.

Additionally, data processing performed after acquisition can be done by a processor, which can be a single processors or multiple processors, including single core processors and multi-core processors. Non-limiting examples of processors can include central processing units (CPUs), graphics processing units (GPUs), application-specific integrated circuits (ASICs), digital signal processors (DSPs), field-programmable gate arrays (FPGAs), application-specific instruction set processors (ASIPs), and the like, including various combinations thereof. In some examples, the processor can be a custom processor designed for the data processing task. Artificial intelligence techniques can also be applied to the data.

One example subsystem includes a SLM and a DOE, where the SLM and DOE can, in some examples, be monolithically fabricated, and in other examples, can be intimately attached to form a single device. In some examples, the DOE can have lateral characteristic length that are approximately equal to or greater than the wavelength of the light used, for example 1550 nm or 2000 nm, and in other examples the lateral characteristic length scales can be substantially less than the wavelength of light. In other examples, the DOE can be a 1-D or 2-D grating. In some cases, the DOE can be aligned to the SLM with tolerances larger than the SLM element pitch, for example 1.7 µm, 2.8 µm, 5.6 µm or 11.2 µm, and in other cases it can be aligned with tolerances smaller than the SLM element pitch. In some cases, the DOE is closer to the SLM, and is not in the far-field. In some cases, the distance from the SLM to DOE can be about 10 µm, 100 µm, 1 mm, 10 mm, or 100 mm. In some examples, the DOE can be on the input face of the SLM and serve in some examples to shape the output beam and/or split the input beam into multiple beams. In other examples, the DOE can be on the exit face of the SLM, and serve to, in addition to other functions, increase the numerical aperture of the light coming from some or all of the SLM elements to values such as 0.87, 0.72, 0.66, or 0.29, which in turn can increase the power efficiency over a wider angular FOV.

Another example subsystem includes a SLM and a microlens array, where the SLM and microlens array, in some examples, can be monolithically fabricated, and in other examples, can be intimately attached to form a single device. The microlenses can be aligned with the SLM pixels, such that a microlens covers an integer number of SLM pixels. For example, each microlens could cover between 1 and 25 SLM pixels, or could cover 1-100 SLM pixels. These microlenses can have a high numerical aperture, such as 0.87, 0.72, 0.66, or 0.29, to allow for a wide angular FOV in which diffraction efficiency is high.

| Example 1 | |
|---|---|
| Wavelength | 1550 nm |
| Coherence | Coherent |
| SLM | Si, PM |
| Add'l Shaping | Monolithic DOE |
| Spots | Multiple |
| Distribution of Light | Monolithic Microlenses |
| Detection | InGaAs APDs |

In one example system, a Si-based SS-SLM comprised of vertical waveguide structures can be used that can impose substantial PM. A vertical waveguide structure can be monolithically fabricated on the SS-SLM chip, for example on the input face, in order to provide multiple diffracted beams, for example, up to third order (i.e. 7 beams) horizontally and up to first order (i.e. 3 beams) vertically, for a total of 21 beams. The SS-SLM can be 8 mm×8 mm in size, and can have waveguides such that the pitch is about 1.0 µm×1.0 µm. Microlenses can also be fabricated, for example monolithically on the output face of the chip, in order to control the diffraction efficiency. The system can be configured for 1550 nm operation and coherent detection, where a portion of the source light is retained and interfered with received light on the sensor. The system can use the same optical path for receiving in addition to transmitting. InGaAs APD point detectors can be used to detect the multiple received beams.

| Example 2 | |
|---|---|
| Wavelength | 2000 nm |
| Coherence | Incoherent |
| SLM | Si, PM + AM |
| Add'l Shaping | None |
| Spots | Single |
| Distribution of Light | None |
| Detection | Ge APD Linear Array |

In another example system, a Si-based SS-SLM can be used that has substantially constant PM and some AM. The system can be designed for 2000 nm operation. The system can be operating for incoherent detection, where a portion of the source light is retained and interfered with received light on a, for example, Ge APD linear array. Light can be received using the same optical path used for transmitting.

In another example, shown in FIGS. 6A-6C, a system is shown from the viewpoint of the +y axis(FIG. 6A), the +x axis(FIG. 6B), and the +z axis(FIG. 6C). This system can include a SLM 607 and one or more static DOEs 606 disposed on it. The SLM 607 may be in communication with a controlling device 609, which can be a chip, and which can be made using a CMOS process. One or more light sources 604, which can be laser sources, emits one or more beams 605 that is then incident from an angle of incidence that is greater than normal incidence on the DOE 606 surface. Because the beams from lasers 604 can be elliptical, the incident angle can be selected so that the projection of the beam onto the chip surface is substantially circular, thereby reducing the need for or complexity of additional beam shaping optics. The light 605 can then pass through the static DOE 606, interact with the SLM 608, reflect back through the DOE 606, and then exit the system. The two passes through the static DOE 606 in total can shape the divergence, beam waist location, and other characteristics of the first through third exit beams 608a-608c. The interaction with the SLM 608 can determine the efficiency, count, and direction of propagation of diffracted beams 608a-608c in both directions lateral to the chip normal. In this way, the system can create multiple beams 608a-608c, and direct them dynamically to enable non-mechanical, high speed scanning. When some of the light exiting the device 608a-608c is reflected back into the device, the light can substantially retrace the same paths that through the system, and then can be detected by a one or more photodetectors 610, which could be one or more point detectors, a linear array, or a 2-D array, and can incorporate signal gain.

In another example, shown in FIGS. 7A-7C, a system is shown from the viewpoint of the +y axis (FIG. 7A), the +x axis (FIG. 7B), and the +z axis (FIG. 7C). This system can include a SLM 707 and one or more static DOEs 706 disposed on it. The SLM 707 may be in communication with a controlling device 709, which can be a chip, and which can be made using a CMOS process. One or more light sources 704, which may be laser sources, emit one or more beams 705. Because the beams from light source 704 can be elliptical, optics may be incorporated to reshape the beams to be substantially circular. The beam 705 is reflected by a beam splitter 711, which can be a polarization beam splitter, and is reflected downward as shown. The light then interacts with one or more polarization optics 712 which can, for example, convert the light polarization from linear to circular. The light 705 can then pass through the static DOE 706, interact with the SLM 707, reflect back through the DOE 706, pass through the one or more polarization optics 712, which can for example convert the polarization from circular to linear polarization, and then exit the system. The two passes through the static DOE 706 in total can shape the divergence, beam waist location, and other characteristics of the first through third exit beams 708a-708c. The interaction with the SLM 708 can determine the efficiency, count, and direction of propagation of diffracted beams 708a-708c in both directions lateral to the chip normal. In this way, the system can create multiple beams 708a-708c, and direct them dynamically to enable non-mechanical, high speed scanning. When some of the light exiting the device 708a-708c is reflected back into the device, the light can substantially retrace the same paths that through the system, and then can be detected by one or more photodetectors 710, which could be one or more point detectors, a linear array, or a 2-D array, and can incorporate signal gain.

Below are disclosed additional systems, devices, and methods for practical, efficient beam steering that have significant advantages over other methods.

One architecture that can be used to make an optical phased array beam steering chip incorporates an array of vertical waveguides. Within each waveguide, two or more resonators may be created. In some examples, the resonators are designed so that actuating the phase response does not cause substantial changes in the amplitude response. The resonators can have similar or different resonances when not coupled, or they can have different resonances when coupled.

The height of the vertical waveguides can be between 3 um and 50 um, between 5 um and 25 um, or between 10 um and 20 um. The waveguide widths can be about 5 um, about 2 um, about 1 um, about 0.5 um. The waveguide cross-sectional shape can be rectangular, square, round, elliptical, or any other closed shape, and that shape can contain region of one or more types of material. The waveguides can be arranged near each other, with a gap between them, the size of which can be around 2 um, around 1 um, around 0.5 um, around 0.3 um, or around 0.2 um. The gap can be filled with material with a lower refractive index than the waveguide, to allow for waveguiding. The gap can be filled with material that is electrically insulating in order to electrically isolate the waveguides from each other.

In some examples, the waveguides can contain one or more quantum wells. In other examples, the waveguides contain one or more doped layers. In some examples the waveguides can be substantially made of III-V semiconductors. In some examples the III-V can be AlAs and GaAs. In other examples the waveguides can be made of silicon.

Figure 8:
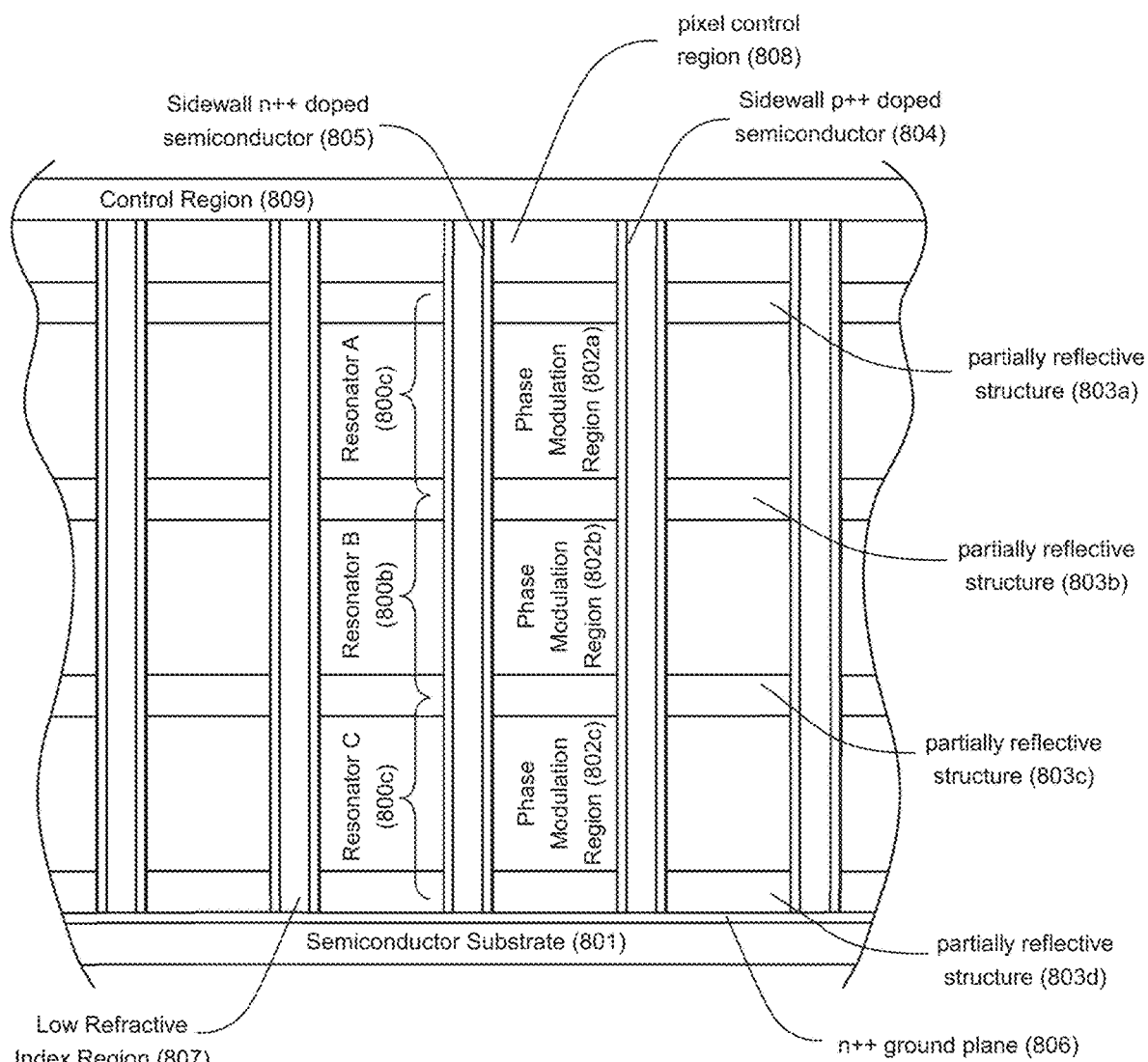
FIG. 8 illustrates an example of a beam steering device in accordance with an example embodiment.

In one example, the vertical waveguide array is shown in FIG. 8 from a side view. The pixels are formed on an undoped semiconductor substrate 801. A doped ground plane 806 is provided. In this example, each pixel consists of two types of regions. One type is a region 802a-c whose phase response can be modulated. The other is a region 803a-d that is a partially reflective structure. As such, three resonators are formed 800a-800c. One resonator is formed by reflectors 803a-b and region 802a. Another resonator is formed by reflectors 803b-c and region 802b. Yet another resonator is formed by reflectors 803c-d and 802c. These resonators are designed to enable phase modulation up to $2\pi$ in magnitude, while keeping the amplitude response substantially flat. Between the waveguides are regions 807 of refractive index that is lower than the refractive index in at least one of regions 802a-c. Region 807 can be vacuum, air, an oxide, a semiconductor, or other suitable material.

On top of the waveguide a semiconductor region 808 can be formed in which circuitry can be fabricated for controlling the pixel's operation. In some examples, the control circuitry can contain one or more transistors. In some examples, the waveguide array can have region 809 disposed on it to, for example, allow for metal signal lines, vias, and electrically insulating material so that pixels can be electrically actuated and controlled.

In some examples, the regions that can be phase modulated 802a-c do so through changes in carrier concentration. This can be through means including but limited to carrier injection, or carrier depletion.

In one example, the regions 802a-c that may be phase modulated consist of alternating layers of p-doped and n-doped semiconductor. Between those layers there can optionally be one or more layers, one or more of which will have substantially different doping than the doping of both the alternating p-doped and n-doped layers. In some examples, the periodicity of the n- and p-doped layers will be about 100 nm, or about 50 nm, or about 30 nm.

In some examples, a region 804 of the waveguide sidewall can be p-doped such that that region 804 makes electrical contact with the p-doped layers in the regions 802a-c, and a region 805 of the waveguide sidewall can be n-doped such that that region 805 makes electrical contact with the n-doped layers in the regions 802a-c. In some examples, a voltage potential can be put across the two doped regions 804 and 805 so as to cause a change in carrier density at each n-doped and p-doped interface. In this way, the carrier density in the volume of the waveguide can be modulated, and thereby the phase modulated. The doping densities can be between $10^{18}$ cm$^{-3}$ and $10^{22}$ cm$^{-3}$, or between $10^{18}$ cm$^{-3}$ and $10^{21}$ cm$^{-3}$, or between $5 \times 10^{18}$ cm$^{-3}$ and $5 \times 10^{19}$ cm$^{-3}$. Note that the doping polarity can be switched in some examples. FIGS. 9A-9C show examples of waveguides having different orders of regions from FIG. 8.

One advantage the previous example offers is that fringing fields can have little impact on a neighboring waveguide, thereby mitigating this common problem with optical phase arrays that can lead to poor performance.

In another example, the waveguide may be substantially round or elliptical in cross-section, where there can be one or more regions substantially in the middle of the waveguide that are doped with one polarity, and where a bounding region of the waveguide is doped with the opposing polarity. In this case, the bounding polarity can be kept at constant electrostatic potential, and the center region(s) voltages changed to actuate the phase. This architecture can then isolate a given waveguide from the electrical signals of any nearby waveguide.

In some examples, the semiconductor in any of the previous examples can be silicon. The doping used can be phosphorus, arsenic, boron, or any other suitable doping material. In some examples, the gaps between the waveguides can be filled partially or fully with silicon dioxide, silicon oxynitride, or silicon nitride. The gaps may also be filled with metal, such as aluminum, copper, tungsten, titanium, or any suitable metal.

Figure 10A:
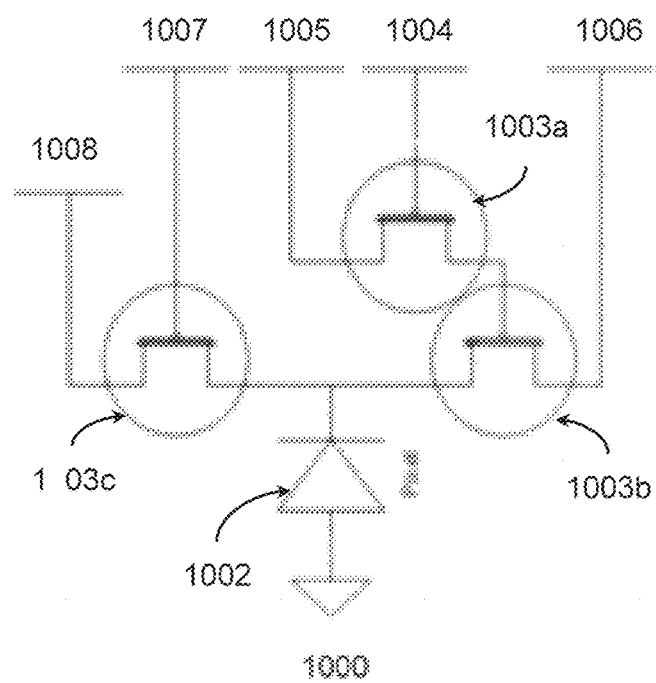
FIG. 10A illustrates an example of a beam steering circuitry in accordance with an example embodiment.
Figure 10B:
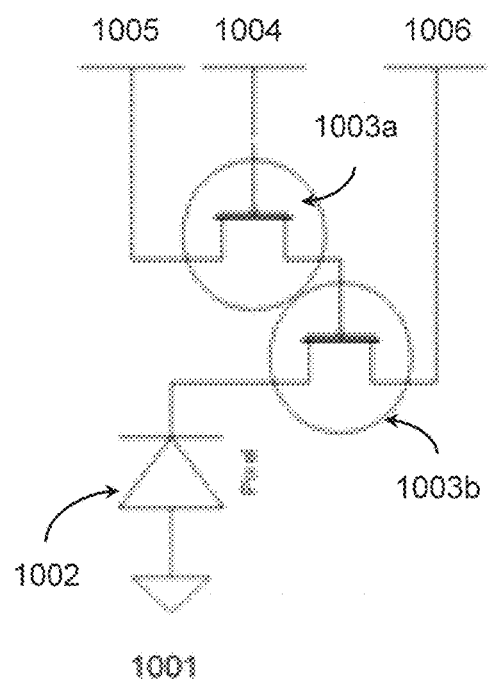
FIG. 10B illustrates an example of a beam steering circuitry in accordance with an example embodiment.

The waveguide circuitry is used to control the waveguide. One example of a waveguide circuit without reset 1001 is shown in FIG. 10A, where the waveguide structure that is to be biased 1002 is represented by a diode symbol. Waveguide circuit 1001 shows a two-transistor circuit, where three signals come to the waveguide: a) a row selecting signal 1004 to control a row-selecting transistor 1003a, b) a column selecting signal 1005 to control a column-selecting transistor 1003b, and c) the bias voltage conductor 1006 to impose on the waveguide 1002. FIG. 10B shows another example circuit with reset 1000 is the same as example circuit 1001, with an additional transistor 1003c, controlled by the reset signal 1007, which can impose the bias voltage from conductor 1008 on the waveguide 1002 to reset the bias.

In some examples, the waveguide array could be 100 million elements or more. In general, setting different biases on each pixel in series can in some instances require signal pathways that can send data at 10's, 100's or even many 1000's of GB/s. In many instances, the fact that beam steering is being done can result in a periodicity across the array in the signal pattern required, the periodic pattern of which will be referred to as a unit cell. In examples where the steering angle is steep, that repeating unit cell can be reasonably small. In this example then, the repeated pattern allows multiple waveguide biases to be updated in parallel, reducing the data rate required by approximately the number of unit cells over the entire array. In another example, where the steering angle is shallow, the unit cell is large. However in this case, waveguides can be grouped in regions where they have substantially the same bias and biased to the same value. This way, again, multiple pixels can be updated in parallel, thereby reducing the data rate required by approximately the number of waveguides within a group with common bias. In one example, m bias levels are used for each linear dimension. In this case, the number of updates required can be limited to $m^2$. For example, if m=8, at most 64 clock updates will be required. If each bias imposition requires one clock tick, then a clock of 64 MHz can be sufficient to update an array of any practical size.

Figure 11:
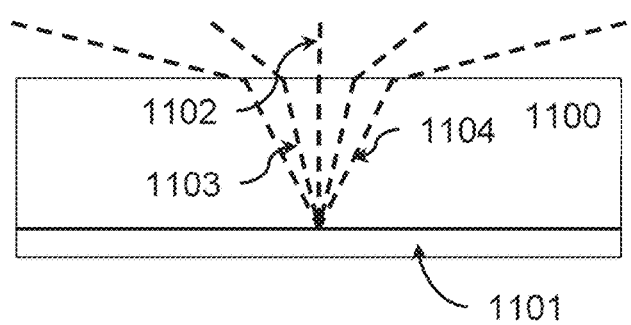
FIG. 11 illustrates an example of a beam steering device in accordance with an example embodiment.

The beam steering chips herein described can be used such that light incident and exiting the chip do so through the substrate 1100 before and after, respectively, interacting with the beam steering optical phased array layer 1101, as shown in FIG. 11. In some examples, the substrate is of higher refractive index that the surrounding environment. In this case, a beam steerer that would have a small angular range can have the angular range increased by refraction at the substrate backside. Beams that exit at nearly normal incident angles 1102 will exit at nearly normal angles. Beams that exit at small angles 1103 will have the angle of exit increased moderately upon refraction. Beams that exit at larger angles 1104 will have their exit angle increase significantly more than shallower angle beams 1103.

In one example, 1550 nm light is steered by a silicon beam steering chip disposed on a silicon substrate. In this example, light exiting the beam steering layer, but is still in the silicon substrate, can have a range of achievable angles might be ±10°. Upon exiting the substrate, the angular range will be increased to about ±36°. In another example, the range of achievable angles might be ±15° which, upon exit from the substrate, can be increased to a range of achievable angles of ±62°.

Another benefit of using the circuit such that light travels through the substrate is that the beam steering layer is closer to the backside where thermal management can be more effectively done.

Figure 12:
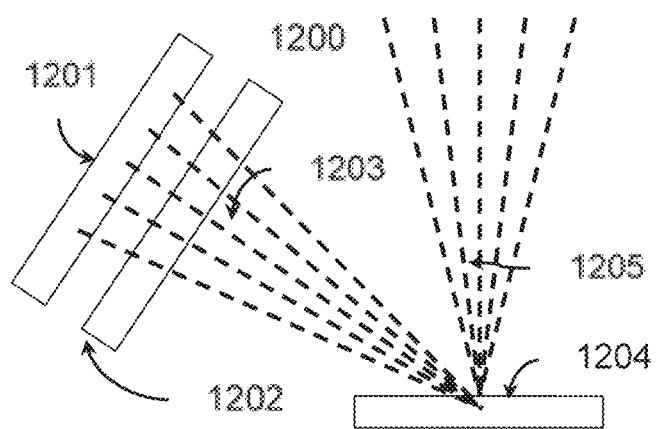
FIG. 12 illustrates an example of a beam steering device in accordance with an example embodiment.

In some instances, it can be desirable to use a single beam steering chip to steer multiple beams simultaneously. One example of a way to achieve multi-laser beam steering 1200 is shown in FIG. 12. A source of multiple beams 1201 emit beams that pass through optionally one or more optics 1202. The resulting bundle of beams 1203 then is incident on the beam steering chip 1204, which steers all beams simultaneously, which then exit as a newly directed bundle of beams 1205. In this example, the source of multiple beams can be an array of laser diodes, an array of vertical cavity surface emitting lasers (VCSELs), a bundle of optical fibers, or others. The beams within the array can be mutually coherent, incoherent, partial coherent, or combinations thereof. The optional optics can be chosen so that the bundle of beams 1203 are converging, but where each individually is diverging to substantially fill the beam steering chip 1204's aperture.

Below are disclosed additional systems, devices, and methods for practical, efficient beam steering that have significant advantages over other methods.

Figure 13:
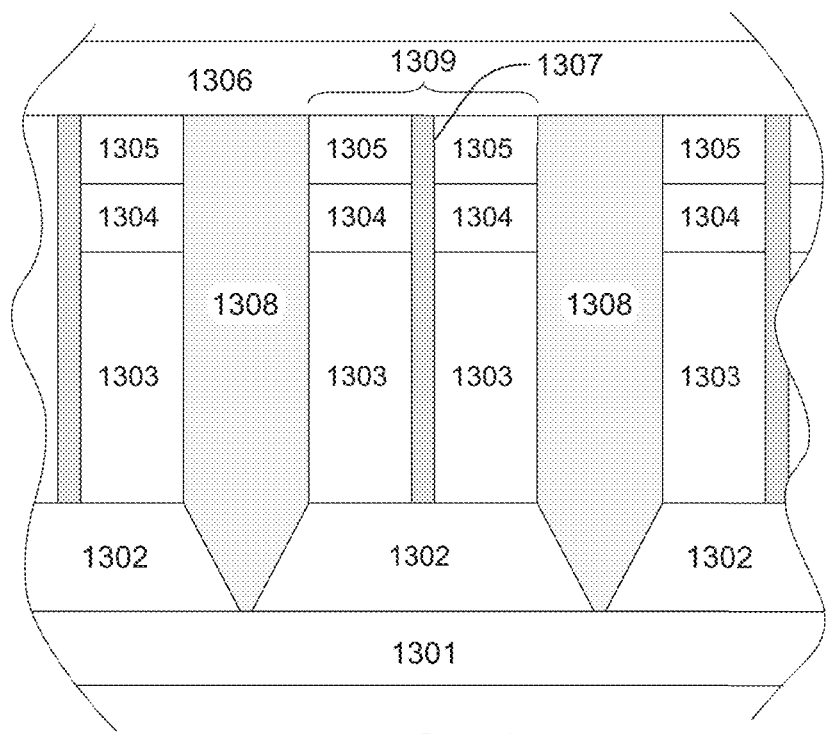
FIG. 13 illustrates an example of a beam steering device in accordance with an example embodiment.

In some examples of optical phased arrays incorporating vertical waveguides, one or more tapers can be formed at the end of one or more waveguides into which light can be coupled. This can increase the light coupling efficiency. The sidewall angle from vertical of the tapers can be between 0° and 5°, between 0° and 10°, between 0° and 15°, or between 0° and 30°, and can be constant along the length of the at least one taper, or the angle can vary with position. An example showing at least one taper connecting to at least one vertical waveguides is shown in FIG. 13.

Figures 14A, 14B, 14C:
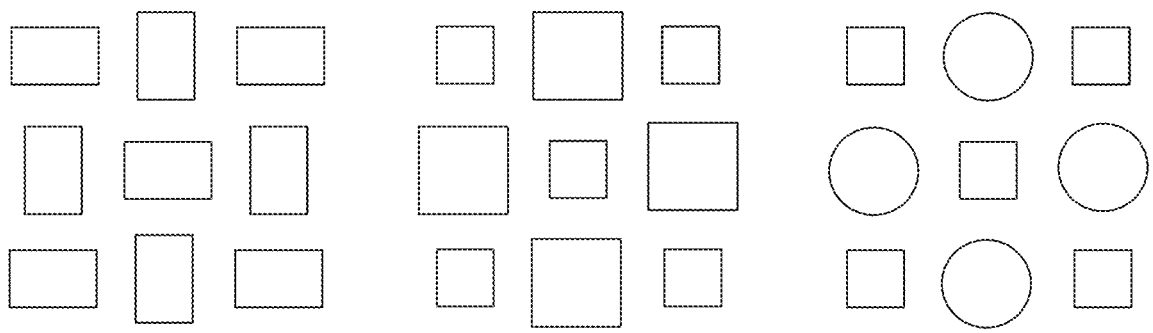
FIG. 14A illustrates an example of a beam steering device in accordance with an example embodiment.
FIG. 14B illustrates an example of a beam steering device in accordance with an example embodiment.
FIG. 14C illustrates an example of a beam steering device in accordance with an example embodiment.

In some examples of optical phased arrays incorporating vertical waveguides, two or more nearest-neighbor waveguides can be sufficiently close to each other that an appreciable amount of optical power can cross-coupling from one waveguide to another. For example, an appreciable amount of optical power can mean more than 20%, more than 10%, more than 5% or more than 1%. Cross-coupling can be suppressed by making the mode propagation constants of nearest-neighbor waveguides dissimilar. This can be accomplished by varying the cross-sectional shape, size, and/or orientation of the two or more waveguides. Some examples are shown in the top view in FIGS. 14A-14C. In the example shown in FIG. 14A, at least two nearest-neighbor waveguides that are the same shape and size but are rotated 90° to one another. In the example shown in FIG. 14B, at least two nearest-neighbor waveguides that are the same shape but different size. In the example shown in FIG. 14C, two or more nearest-neighbor waveguides that are of different shapes but the same size. Any suitable variation or combination of variations in nearest neighbor waveguides that changes their propagation constant can work in the manner described herein.

Solid-state SLMs (SS-SLMs) can be comprised of silicon (Si), silicon dioxide ($SiO_2$), silicon nitride (Si3N4), silicon oxynitride (SiOxNy), silicon-germanium (SiGe), germanium (Ge), gallium arsenide (GaAs), aluminum arsenide (AlAs), aluminum gallium arsenide (AlxGayAs), indium gallium arsenide (InxGayAs), indium phosphide (InP), aluminum gallium indium nitride (AlGaInN), aluminum gallium indium phosphide (AlGaInP), gallium nitride (GaN), mercury cadmium telluride (HgCdTe), other III-V materials or the like, including combinations thereof.

In some examples of optical phased arrays incorporating vertical waveguides, at least one vertical waveguide can include one or more regions with a refractive index lower than the surrounding waveguide and that overlaps substantially with the optical mode. Each of the at least one lower refractive index regions can have one or more small dimensions in comparison to the wavelength of light. The at least one or more low refractive index region can be comprised of a material with an electrically actuatable refractive index, such that the propagation constant of the entire mode can be substantially actuated. The material in the at least one low refractive index region can also be of high electrical resistance, such that application of a bias across the at least one low refractive index region leads to very little current flow and power consumption. The high refractive index material on either side of the at least one low refractive index region can be used as electrodes for applying an electrical bias across the at least one low refractive index region.

Additionally, in some examples, a confinement structure surrounds the periphery of each waveguide, where the confinement structure has a lower refractive index compared to the refractive indexes of the first contact region and the second contact region.

Returning to RIG. 13, an example of an optical phased array device incorporating vertical waveguides is shown. The device includes a silicon taper 1302 disposed on a semiconductor substrate in order to enable efficient coupling into the vertical waveguides 1309 optical power entering the device from the substrate 1301. The device includes a silicon taper 1302 disposed on a substrate, which enables efficient coupling into the vertical waveguides 1309 of optical power entering the device from the substrate 1301. In one example, a vertical waveguide 1309 includes a contact 1303, an optically reflective layer 1304, a discontinuous control layer 1305, and a low refractive index material 1307. In some examples, the waveguide can be disposed on a taper 1302. In other examples, the vertical waveguide 1309 can be disposed on or directly on the substrate 1301. Vertical waveguides 1309 are optically separated from one another by optical isolation material 1308, which has a refractive index that is lower than the effective refractive index of the vertical waveguide 1309. A continuous control layer 1306 containing signal lines, vias, etc. is disposed on top of the vertical waveguide array. A discontinuous control layer 1305 can provide transistors, doped contact regions, etc. to allow control of a bias imposed on each vertical waveguide 1309. The low refractive index material 1307 can be encapsulated by, for example, layer 1306, can be open to the ambient environment through openings in layer 1306 (not shown), or can be open to the ambient environment by other means (not shown). This low refractive index material 1307 includes a material having a refractive index that can be effectively modulated by a bias (i.e., voltage) provided across the low refractive index material 1307 by contact 1303.

In some examples, one of the dimensions of at least one low refractive index material is less than 200 nm. In another example, one dimension is less than 100 nm. In yet another example, one dimension is less than 50 nm. In still another example, one dimension is less than 25 nm.

The material comprising the low refractive index material can be a semiconductor, a dielectric, a polymer, a liquid crystal, or any other suitable material, including combinations thereof. Semiconductors can include silicon, germanium, gallium arsenide, aluminum arsenide, aluminum gallium arsenide, indium phosphide, indium gallium arsenide, gallium nitride, including strained variants thereof, among others. Dielectrics can include silicon dioxide, silicon nitride, silicon oxynitride, and the like. Polymers can be nonlinear, electro-optic, dendritic, etc. Polymers can also include hyperpolarizable chromophores and can be poled. Specific polymers can include PMMA, polycarbonate, sol-gel, and others. Chromophores can include YLD 124, DR1, CLD1, AJL8, AJLS102, JT1, AJ307, AJ309, AJ404, and AJ-CKL1. Liquid crystals can be of the thermotropic, lyotropic, or metallotropic phases. Thermotropic phases can include the nematic phase, smectic phase, or other phases of liquid crystal. Applicable liquid crystals can be organic, and can incorporate lipids, proteins, DNA, polypeptides, and others. They can also be inorganic, and can include various oxides such as vanadium oxide, carbon nanotubes, graphene, and the like. Liquid crystals can include 4-Cyano-4'-pentylbiphenyl (5CB), various biphenyl (BP) molecules such as E7, N-(4-Methoxybenzylidene)-4-butylaniline (MBBA), and the like.

In some examples of optical phased arrays incorporating vertical waveguides, at least one vertical waveguide can be designed to operate in transmission mode. In this example, the control lines and circuit elements can be at least partially placed away from the exit apertures of each vertical waveguide, to reduce the optical loss. At least one taper can be used on the inputs of the vertical waveguides in transmission mode, and optionally at the outputs of at least one of the vertical waveguides.

Figure 15:
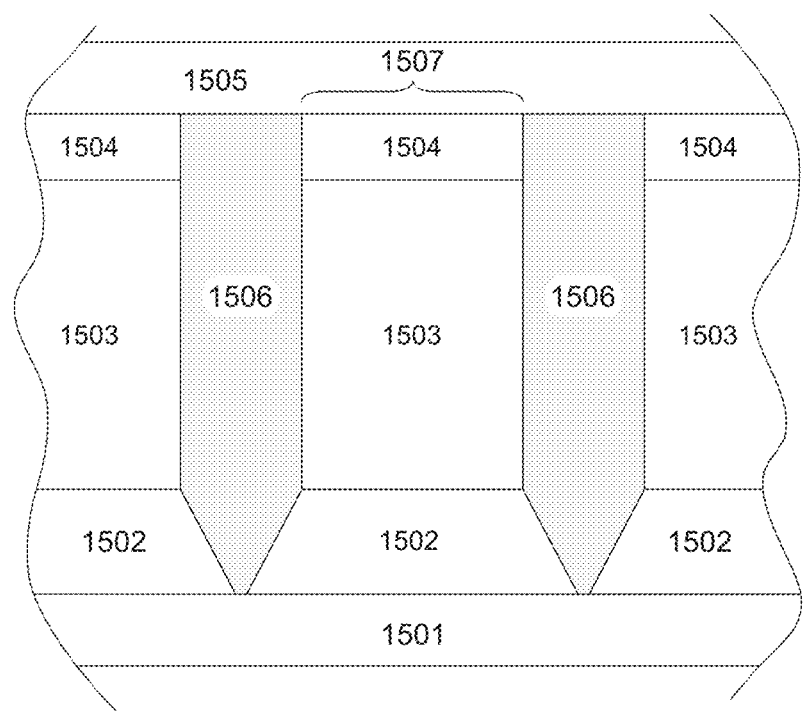
FIG. 15 illustrates an example of a beam steering device in accordance with an example embodiment.

An example structure 1500, shown in FIG. 15, includes a substrate 1501 with a taper 1502 disposed thereon for each vertical waveguide 1507. Contact 1503 is disposed on the taper 1502 and a control layer 1504 is coupled to contact 1503, which can be used to control the phase actuation. Optical isolation material 1506 separates each waveguide 1507, and a continuous control layer 1505 is disposed on top of the vertical waveguides to provide signal lines, vias, and other necessary circuit structures (i.e., control structures). To reduce optical loss, the control structures in the continuous control layer 1505 can be placed substantially over the optical isolation material 1506. The waveguides 1507 can be any suitable waveguide structure and can include narrow regions described previously and shown in FIG. 13.

Figure 16:
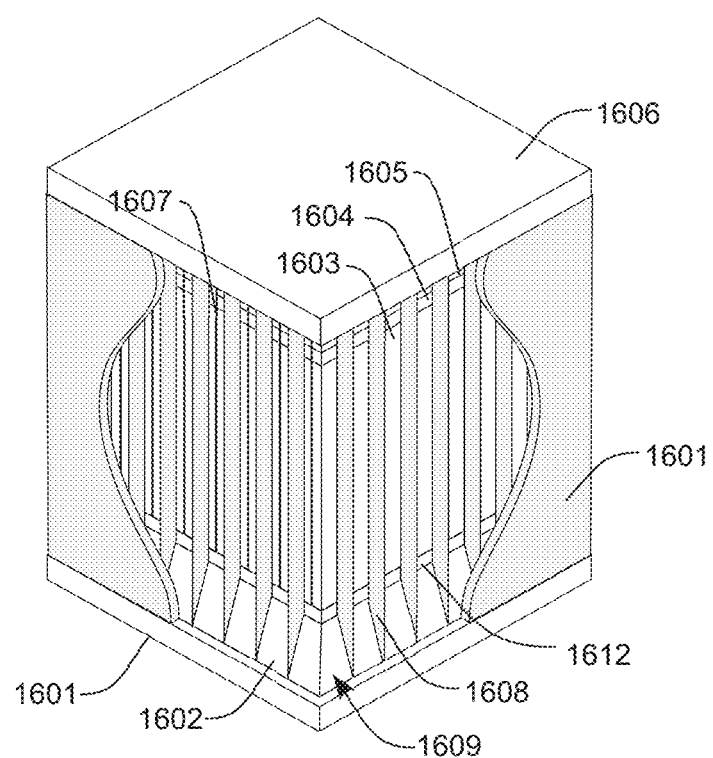
FIG. 16 illustrates an example of a beam steering device in accordance with an example embodiment.

One example of an optical phased array device incorporating vertical waveguides is shown in FIG. 16. The device includes a silicon taper 1602 disposed on a semiconductor substrate in order to enable efficient coupling into the vertical waveguides 1609 of optical energy entering the device from the substrate 1601.

A vertical waveguide 1609 includes a contact 1603, an optically reflective layer 1604, a control layer 1605, and a low refractive index material 1607. In some examples, a vertical waveguide 1609 can be disposed on a taper 1602. In other examples, a vertical waveguide 1609 can be disposed on a substrate 1601. Vertical waveguides 1609 are optically isolated from one another by an optical isolation material 1608, which has a refractive index that is lower than the effective refractive index of the vertical waveguide 1609. A continuous control region 1606 containing signal lines, vias, etc. is disposed on top of the waveguide array. A discontinuous control layer 1605 can provide transistors, doped contact regions, etc. to allow control of a bias imposed on each vertical waveguide 1609. Low refractive index material 1607 can be encapsulated by, for example, the continuous control layer 1606, can be open to the ambient environment through openings in layer 1306 (not shown), or can be open to the ambient environment by other means (not shown). This low refractive index material 1607 includes a material having a refractive index that can be effectively modulated by a bias (i.e., voltage) provided across the low refractive index material 1607 by contact 1603. Further shown is an oxide layer 1612 between the silicon taper 1602 and the contact 1603.

In some examples of optical phased arrays, waveguides can be arranged to receive light in a direction normal to a surface upon which they are aligned. For example, waveguides arranged in an array along a surface receive light from a direction that is normal to that surface. In a more specific example, a waveguide or array of waveguides disposed on a planar substrate receive light from a direction that is normal to the plane of the support substrate, which in many cases, would be light that is transmitted through the support substrate and into the waveguides. In other cases, however, such would include light being transmitted into the waveguides and toward the support substrate. In yet another example, the light can be delivered through substrate or other material layer to the waveguide at any oblique angle that can facilitate the intended functionality of the device. In some examples, the oblique angle can be between 0° and 0.1°, between 0° and 1°, between 0° and 5°, between 0° and 10°, between 0° and 45°, or between 0° and 89°. In some examples, waveguides that receive light through the substrate upon which they are disposed can be referred to as "vertical waveguides." In other examples, a vertical waveguide can describe a waveguide where light passes through the waveguide and into the substrate upon which it is disposed.

In some cases, the support or other substrate upon which an array of waveguides is disposed may not be aligned along a 2D plane; in such cases, the direction of the light entering the waveguide can be determined from the plane established from the region upon which the waveguide sits. It is understood that the determination of directionality of transmitted light to a waveguide is well within the abilities of one of ordinary skill in the art.

What is claimed is:

1. A vertical waveguide device, comprising:
   a plurality of vertical waveguides disposed on a support substrate in an array, where each vertical waveguide further comprises;
   a reflective region positioned to reflect impinging light toward the support substrate;
   a core region extending from the reflective region to the support substrate, the core region further comprising;
   a first contact and a second contact electrically isolated from one another disposed between the reflective region and the support substrate; and
   a low refractive index material disposed between the first contact and the second contact, wherein the first contact and the second contact are configured to create a voltage drop across the low refractive index material, and wherein the low refractive index material has a lower refractive index compared to the refractive indexes of the first contact and the second contact; and
   an optical isolation material disposed between the plurality of vertical waveguides in the array, wherein the optical isolation material has a lower refractive index compared to the refractive indexes of the first contact and the second contact.

2. The device of claim 1, wherein the support substrate is a semiconductor substrate.

3. The device of claim 2, wherein the support substrate is a silicon substrate.

4. The device of claim 2, wherein the optical isolation material extends into the semiconductor substrate.

5. The device of claim 4, wherein the optical isolation material includes a confinement structure in the semiconductor substrate to improve light trapping.

6. The device of claim 1, further comprising a control layer electrically coupled to the first contact and to the second contact, wherein the control layer further comprises control lines to control the first contact and the second contact.

7. The device of claim 1, wherein the low refractive index material is comprised of a material selected from a semiconductor, a dielectric, a polymer, a liquid crystal, or a combination thereof.

8. The device of claim 7, wherein the low refractive index material is comprised of a semiconductor selected from silicon, germanium, gallium arsenide, aluminum arsenide, aluminum gallium arsenide, indium phosphide, indium gallium arsenide, or gallium nitride, or a combination, including strained variants thereof.

9. The device of claim 7, wherein the low refractive index material is comprised of a dielectric selected from silicon dioxide, silicon nitride, silicon oxynitride, or a combination thereof.

10. The device of claim 7, wherein the low refractive index material is comprised of a polymer selected from a nonlinear polymer, an electro-optic polymer, a dendritic or a combination thereof.

11. The device of claim 10, wherein the low refractive index material is comprised of an electro-optic polymer.

12. The device of claim 11, wherein the electro-optic polymer is comprised of a hyperpolarizable chromophore.

13. The device of claim 7, wherein the low refractive index material is comprised of a liquid crystal.

14. The device of claim 13, wherein the liquid crystal has a phase selected from thermotropic, lyotropic, or metallotropic phases.

15. The device of claim 14, wherein the liquid crystal has a thermotropic phase selected from nematic or smectic phases.

16. The device of claim 15, wherein the liquid crystal has a nematic thermotropic phase.

\* \* \* \* \*